(12) United States Patent
Riou

(10) Patent No.: US 10,389,522 B2
(45) Date of Patent: Aug. 20, 2019

(54) SECURE DATA STORAGE

(71) Applicant: NXP B.V., Eindhoven (NL)

(72) Inventor: Sebastien Riou, Hamburg (DE)

(73) Assignee: NXP B.V., Eindhoven (NL)

( * ) Notice: Subject to any disclaimer, the term of this patent is extended or adjusted under 35 U.S.C. 154(b) by 187 days.

(21) Appl. No.: 15/424,842

(22) Filed: Feb. 4, 2017

(65) Prior Publication Data
US 2017/0230169 A1    Aug. 10, 2017

(30) Foreign Application Priority Data

Feb. 5, 2016   (EP) .................................... 16154488

(51) Int. Cl.
| | | |
|---|---|---|
| *H04L 9/00* | (2006.01) | |
| *G06F 21/72* | (2013.01) | |
| *G06F 7/58* | (2006.01) | |
| *H04L 9/06* | (2006.01) | |
| *G09C 1/00* | (2006.01) | |

(Continued)

(52) U.S. Cl.
CPC .............. *H04L 9/004* (2013.01); *G06F 7/584* (2013.01); *G06F 7/588* (2013.01); *G06F 21/72* (2013.01); *G09C 1/00* (2013.01); *H04L 9/003* (2013.01); *H04L 9/0643* (2013.01); *H04L 9/0894* (2013.01); *G06K 19/073* (2013.01); *G06K 19/07309* (2013.01); *G06K 19/07318* (2013.01); *G06K 19/07363* (2013.01); *G11C 7/24* (2013.01); *G11C 13/0059* (2013.01)

(58) Field of Classification Search
CPC ..... H04L 9/004; H04L 9/0643; H04L 9/0603; H04L 9/28; G06K 19/07318; G06K 19/07363; G06K 19/07309; G06K 19/073; G11C 7/24; G11C 13/0059; G11C 19/00; G06F 7/584; G06F 7/588; G06F 21/72

See application file for complete search history.

(56) References Cited

U.S. PATENT DOCUMENTS

| | | | | |
|---|---|---|---|---|
| 5,995,539 | A | * 11/1999 | Miller | ...................... H04K 1/02 |
| | | | | 375/222 |
| 2002/0176578 | A1 | * 11/2002 | LaPat | ....................... H04L 9/12 |
| | | | | 380/265 |

(Continued)

OTHER PUBLICATIONS

Serial Peripheral Interface Bus—Wikipedia, 13 pgs, Dec. 7, 2013, Retrieved from the Internet: URL:http://en.wikipedia.org/w/index.php?Serial_Peripheral_Interface_Bus&oldid=584991340 [retrieved on Feb. 18, 2015].

(Continued)

*Primary Examiner* — Carl G Colin
*Assistant Examiner* — Gary E Lavelle

(57) ABSTRACT

The disclosure relates to secure data storage and retrieval, in particular to methods and circuits for securely storing data to reduce the possibility of leakage via side channel attacks. Embodiments disclosed include a method of storing a value comprising a series of words, the method comprising: i) combining in a series of XOR operations a word of a first portion of the value, a word of a second portion of the value and an output word of a first random number generator to provide a first combined word; ii) storing the first combined word in a shift register; and iii) repeating steps i) and ii) for each successive word of the first and second portions of the value.

9 Claims, 4 Drawing Sheets

(51) Int. Cl.
*H04L 9/08* (2006.01)
*G11C 7/24* (2006.01)
*G06K 19/073* (2006.01)
*G11C 13/00* (2006.01)

(56) References Cited

U.S. PATENT DOCUMENTS

| | | | | |
|---|---|---|---|---|
| 2005/0271202 | A1* | 12/2005 | Shu | G06F 9/3001 380/29 |
| 2006/0153372 | A1* | 7/2006 | Kim | G06K 19/07363 380/30 |
| 2007/0263861 | A1* | 11/2007 | Kiyomoto | H04L 9/0668 380/46 |
| 2009/0204657 | A1* | 8/2009 | Goettfert | G06F 7/588 708/255 |
| 2011/0252244 | A1* | 10/2011 | Lesea | G06F 21/72 713/192 |
| 2012/0189118 | A1* | 7/2012 | Beck | H04L 9/0662 380/42 |
| 2014/0254792 | A1* | 9/2014 | Gammel | H04L 9/0668 380/28 |

OTHER PUBLICATIONS

Elbaz, R. et al. "Hardware Engines for Bus Encryption: A Survey of Existing Techniques", IEEE Proceedings Design, Automation and Test in Europe, 6 pgs (Mar. 7, 2005).

Extended European Search Report for Patent Appln. No. 16154488.7 (dated Jul. 21, 2016).

Moradi, A. et al. "Pushing the limits: A very compact and a threshold implementation of AES", Annual International Conference on the Theory and Applications of Cryptographic Techniques, Eurocrypt, pp. 69-88 (2011).

Nikova, S. et al. "Threshold Implementations Against Side-Channel Attacks and Glitches", Information and Communications Security, Springer, vol. 4307, pp. 529-545 (2006).

Bhatkari, S. et al. "Data Space Randomization", Lecture Notes in Computer Science—Detection of Intrusions and Malware, and Vulnerability Assessment, pp. 1-22 (Jul. 10, 2008).

Kocher, P. et al. "Differential Power Analysis", Annual International Cryptography Conference, CRYPTO 1999, Springer-Verlag, vol. 1666 pp. 388-397 (1999).

* cited by examiner

SECURE DATA STORAGE

CROSS-REFERENCE TO RELATED APPLICATIONS

This application claims the priority under 35 U.S.C. § 119 of European patent application no. 16154488.7, filed on Feb. 5, 2016, the content of which are incorporated by reference herein.

FIELD

The disclosure relates to secure data storage and retrieval, in particular to methods and circuits for securely storing data to reduce the possibility of leakage via side channel attacks.

BACKGROUND

A general problem in secure data storage is the possibility of side channel leakage, such that power analysis on a circuit can be used to reveal operations in the circuit that are intended to be secret. Revealing such operations can result in cryptographic codes operating in the circuit being broken and a consequent loss of security. This is a particular problem with circuits that need to operate in a 'hostile' environment, i.e. where there is uncontrolled access to the circuit, such as in a smart card where embedded integrated circuits perform cryptographic operations for secure transactions. The general problem of side channel leakages and ways to exploit them was introduced by Kocher et al in "Differential Power Analysis", CRYPTO '99, Vol. 1666 of Lecture Notes in Computer Science (LCNS), pp. 388-397, 1999.

One way of addressing the problem of side channel leakage is through masking techniques, for example using a technique known as threshold implementation, as proposed by Nikova et al in "Threshold Implementations Against Side-Channel Attacks and Glitches", ICICS 2006, Vol. 4307 of LNCS, pp. 529-545, 2006. An example of a secure AES based implementation has been introduced by Moradi et al in "Pushing the limits: A very compact and a threshold implementation of AES", EUROCRYPT, Vol. 6632 of LNCS, pp 69-88. 2011. Such implementations, however, require substantially increased storage requirements, due to the additional space required for masking data. The Moradi implementation, for example, requires three times that of a conventional AES implementation. This is a problem for implementations where storage and processing power is at a premium, such as in smart card applications.

SUMMARY

In accordance with a first aspect there is provided a method of storing a value comprising a series of words, the method comprising:
 i) XOR combining a word of a first portion of the value, a word of a second portion of the value and an output word of a first random number generator to provide a first combined word;
 ii) storing the first combined word in a shift register; and
 iii) repeating steps i) and ii) for each successive word of the first and second portions of the value.

XOR combining data represented by portions of a value (commonly termed 'shares') with the output of a random number generator allows for the data to be masked during a storage operation. Because the data that is stored in the shift register is combined with a sequence of random (or pseudo random) numbers, the possibility of accessing the data from storage is reduced, thereby allowing for less protection of the storage. The result is a substantially reduced need for storage, typically less than half that of known implementations. The gain may be even greater for applications where large states are used, such as in secure hash algorithms where some states may be up to 1024 bits (for example the 'w' state in SHA-512).

Embodiments disclosed herein retain security while reducing the required amount of storage. The reduction of storage will tend to be a trade-off against some additional area for combinational logic, but in practice the overall gain can be large because conventional registers are usually heavily protected against fault attacks, so the cost to store a secret bit is much more than the cost of a simple flip-flop multiplied by the number of shares.

Circuits described herein are suitable for values that are accessed in a serial manner, and are not suitable for those requiring random access. The AES state for example does not lend itself to a serial access pattern due to the orthogonality of the shift rows and mix column operations, but the AES key and SHA2 "w" array are compatible with serial access.

To retrieve data the method may comprise the steps of:
 iv) outputting a first output word from the shift register;
 v) outputting a second output word from a second random number generator; and
 vi) repeating steps iv) and v) for each successive word stored in the shift register.

The first and second random number generators may be pseudo random number generators configured to generate the same sequence of words, the outputs from the first and second random number generators being shifted relative to each other in the sequence of words by a length of the shift register. Using a pseudo random number generator allows for the stored data to be retrieved without compromising on the security of the stored data, because a pseudo random number generator will always generate the same sequence of words given the same starting seed value. The first and second random number generators can therefore be configured to operate shifted relative to each other so that the second random number generator produces the same word for a word output by the shift register that was produced by the first random number generator when the word was stored.

Step i) of the method may comprise:
 ia) XOR combining the word of the second portion of the value with the output word of the first random number generator to provide a second combined word; and
 ib) XOR combining the word of the first portion of the value with the second combined word to provide the first combined word.

In retrieving data, step iv) may comprise XOR combining the first output word with an output word of a third random number generator to provide a first combined output word; and step v) may comprise XOR combining the second output word with the output word of the third random number generator to provide a second combined output word.

Step i) of the method may comprise:
 ia) XOR combining the output word of the first random number generator with an output word of a or the third random number generator to provide a second combined word;
 ib) XOR combining the word of the second portion of the value with the second combined word to provide a third combined word;

ic) XOR combining the output word of the third random number generator with the word of the first portion of the value to provide a fourth combined word; and id) XOR combining the fourth combined word with the third combined word to provide the first combined word.

The third random number generator may generate a different sequence of words to the sequence of words generated by the first and second random number generators.

The third random number generator may be a true random number generator, i.e. a random number generator where the sequence of words is not determinative as in a pseudo random number generator. In alternative embodiments the third random number generator may be a pseudo random number generator configured to generate a different sequence to that generated by the first and second random number generators.

In accordance with a second aspect there is provided a circuit for storing a value comprising a series of words, the circuit comprising:

a first input for receiving a word of a first portion of the value;

a second input for receiving a word of a second portion of the value;

a first random number generator;

a first XOR gate having inputs connected to the second input and an output of the first random number generator;

a second XOR gate having inputs connected to the first input and an output of the first XOR gate; and a shift register having an input connected to an output of the second XOR gate and having an output.

The circuit may further comprise a second random number generator, wherein the first and second random number generators are pseudo random number generators configured to generate the same sequence of words, the outputs from the first and second random number generators being shifted relative to each other in the sequence of words by a length of the shift register.

The circuit may comprise a third XOR gate connected between the first input and the second XOR gate, the third XOR gate having inputs connected to the first input and an output of a third random number generator and an output connected to an input of the second XOR gate.

The circuit may comprise a fourth XOR gate connected between the first random number generator and the first XOR gate, the fourth XOR gate having inputs connected to the first random number generator and the third random number generator and an output connected to an input of the first XOR gate.

The circuit may comprise a fifth XOR gate having inputs connected to the output of the shift register and the third random number generator.

The circuit may comprise a sixth XOR gate having inputs connected to the second random number generator and the third random number generator.

The circuit may be incorporated into an integrated circuit in an IC card, commonly known as a smart card, for use in identification, authentication or other applications requiring secure on board cryptographic operations.

There may be provided a computer program, which when run on a computer, causes the computer to configure any apparatus, including a circuit, controller, sensor, filter, or device disclosed herein or perform any method disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software implementation may be an assembly program.

The computer program may be provided on a computer readable medium, which may be a physical computer readable medium, such as a disc or a memory device, or may be embodied as a transient signal. Such a transient signal may be a network download, including an internet download.

These and other aspects of the invention will be apparent from, and elucidated with reference to, the embodiments described hereinafter.

BRIEF DESCRIPTION OF DRAWINGS

Embodiments will be described, by way of example only, with reference to the drawings, in which.

Figure 1:
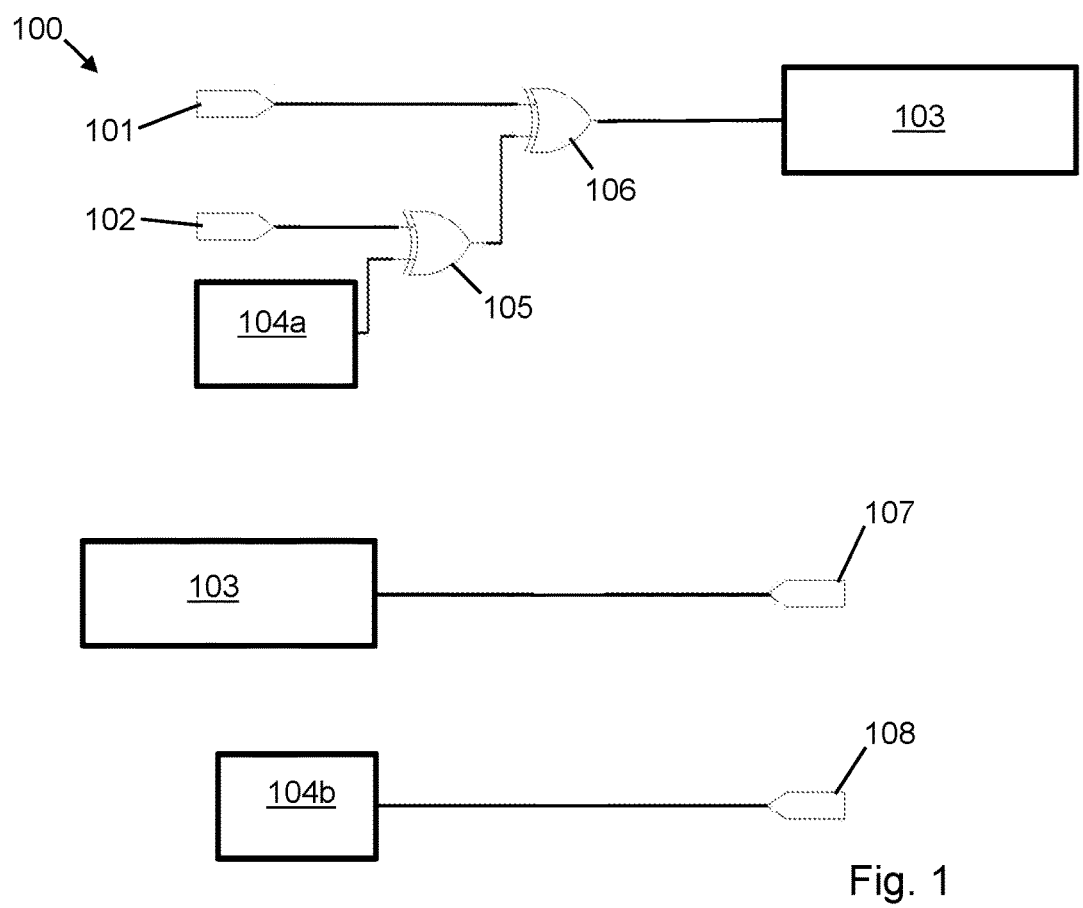
FIG. 1 is a schematic circuit diagram of an example embodiment for storing and retrieving a value.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar feature in modified and different embodiments.

DETAILED DESCRIPTION OF EMBODIMENTS

FIG. 1 illustrates a schematic diagram of an example embodiment of a circuit 100 for storing and retrieving a data value provided as two portions (or shares). The value is provided as first and second portions at first and second inputs 101, 102, and is stored in a shift register 103 after being XOR combined with the output of a first random number generator 104a. A first XOR gate 105 has inputs connected to the second input 102 and an output of the first random number generator 104a. A second XOR gate 106 has inputs connected to the output of the first XOR gate 105 and the first input 101. An output of the second XOR gate 106 provides a combined word to the shift register 103.

The shift register 103 is configured to store N words of M bits together with the state of the two random number generators 104a, 104b. Each time a value is written or "shifted-in", another value is read or "shifted-out" at the other end of the shift register 103.

As used herein, the term "word" refers to a unit of digital information consisting of M bits (where a bit is a single binary digit, i.e. 1 or 0), where M is an integer greater than one. A word may be a byte, commonly defined as a group of eight bits, or any other number appropriate for the particular application, such as 16, 32 etc.

On the output side, a first portion is provided at a first output 107 and a second portion at a second output 108. The first output 107 is provided by the shift register 103, and the second output 108 is provided by a second random number generator 104b. The second random number generator 104b is identical to the first random number generator 104a, i.e. is a pseudo random number generator initiated by the same seed. The second random number generator 104b is, however, configured to provide a word in a set sequence of words that is shifted by a number of words equal to the length of the shift register 103. The result is that a word being stored in the shift register 103 is combined with the same value produced by the first random number generator 104a as the value that is output by the second random number generator 104b when the stored word is output from the shift register. The shift register 103 may be able to store N words, each word consisting of M bits. Each of the connections between the various components in the circuit 100 are M bits wide, i.e. the inputs 101, 102 and the random number generators 104a, 104b all provide words having equal number of bits. The length of the shift register 103 is therefore defined by the number of words stored between the input and output, i.e. the number N. The shift register 103 may have multiple parallel registers, each N words long, resulting in the shift register 103 being capable of storing a multiple of N words.

The embodiment in FIG. 1 shows the first XOR gate 105 connected before the second XOR gate 106. Since XOR operations are commutative and associative, the same output could be achieved with the XOR gates arranged with the second XOR gate connected before the first XOR gate, with the input to the shift register 103 being provided by the first XOR gate. This would, however, result in the portions from the first and second inputs 101, 102 being XOR combined, which results in the plain input value, thereby compromising the security of the circuit 100. The arrangement as shown in FIG. 1 avoids this by first combining the second input value with the output from the first random number generator 104a.

The first and second random number generators 104a, 104b must be identical and seeded with the same seed for the data values to be extracted correctly from the shift register 103. The design of the random number generators 104a, 104b may be fixed in the design of the circuit 100 and can be assumed to be public knowledge. Since the quality of the outputs from the random number generators 104a, 104b has a direct impact on security, it is important that their outputs are uniformly distributed. The output of each random number generator is a sequence of words, each having M bits, i.e. the same as the number of bits in each of the input words. If M is smaller than 32 bits, the internal state of the random number generators must be carefully dimensioned. If the random number generators have a small state of say 8 bits, the number of possible mask sequence is limited to 256 ($=2^8$), since there are 256 starting states (or even 255 if implemented as a simple linear feedback shift register). For all practical applications 256 starting states is definitely too small since it is common for attackers to gather several millions of power traces. A state of 16 bits gives 65,536 possible sequences ($2^{16}$), while a state of 32 bits gives over 4 billion ($2^{32}$) possible sequences, which is a much safer choice. In general therefore, the number of bits in each word should be 16 or more.

Figure 2:
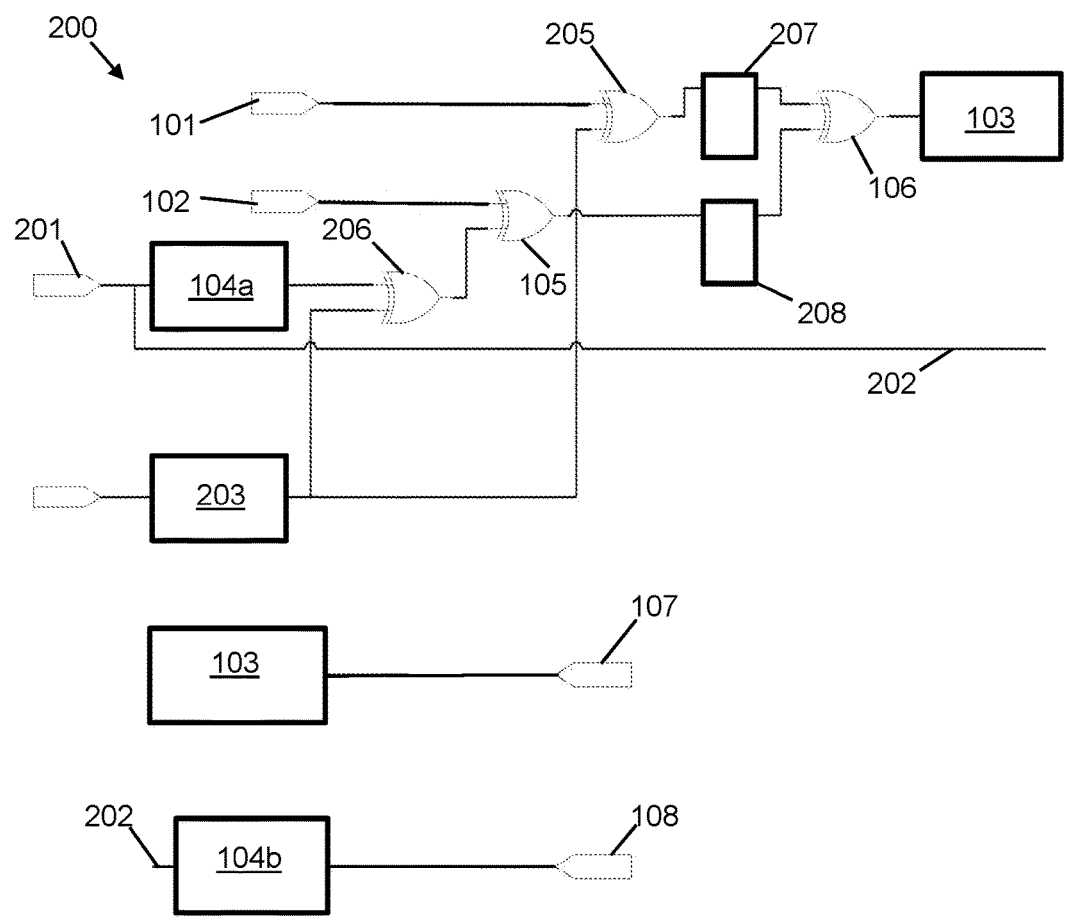
FIG. 2 is a schematic circuit diagram of an alternative example embodiment for storing and retrieving a value.

FIG. 2 illustrates an alternative example embodiment of a circuit 200 for storing and retrieving data values, in which further remasking of data values is implemented at the input stage to further minimise or prevent first order leakage. As with the circuit 100 of FIG. 1, the circuit 200 comprises first and second inputs 101, 102 and first and second random number generators 104a, 104b, each of which is fed by a common seed at an input 201. The common seed may be a true random seed, and is provided to the second random number generator via connection 202.

The circuit 200 further comprises a third random number generator 203, which may be a pseudo random number generator or a true random number generator, but in either case provides a sequence of words that is different to the first and second random number generators 104a, 104b, through being fed by a different seed. The output from the third random number generator 203 is XOR combined with the output from the first random number generator 104a and with the first and second inputs 101, 102. The effect of the third random number generator 203 is to provide further masking of data values as they are being stored. If one considers the effect of the third random number generator generating only zero values, the overall effect of the circuit 200 is the same as the circuit 100 in FIG. 1.

In the circuit 200 in FIG. 2, a third XOR gate 205 is connected between the first input 101 and the second XOR gate 106, the third XOR gate 205 having inputs connected to the first input 101 and an output of the third random number generator 203. A fourth XOR gate 206 is connected between the first random number generator 104a and the first XOR gate 105, the fourth XOR gate 206 having inputs connected to the first random number generator 104a and the third random number generator 203 and an output connected to an input of the first XOR gate 105.

Also shown in the circuit 200 in FIG. 2 are first and second D-type flip-flops (or latches) 207, 208, with the first flip-flop 207 connected between the second and third XOR gates 106, 205 and the second flip-flop 208 connected between the output of the first XOR gate 105 and an input of the second XOR gate 106. The D input of the first flip-flop 207 is connected to the output of the third XOR gate 205 and the Q output is connected to an input of the second XOR gate (the $\overline{Q}$ output not being connected). The second flip-flop 208 is similarly connected between the output of the first XOR gate 105 and an input of the second XOR gate 106. The flip-flops 207, 208 serve to further mask stored data values through ensuring that the XOR gate 106 is fed with words only according to a clock cycle. The flip-flops 207, 208 thereby serve to prevent glitches because, if the inputs are not glitch-free, a power trace may otherwise leak information.

Figure 3:
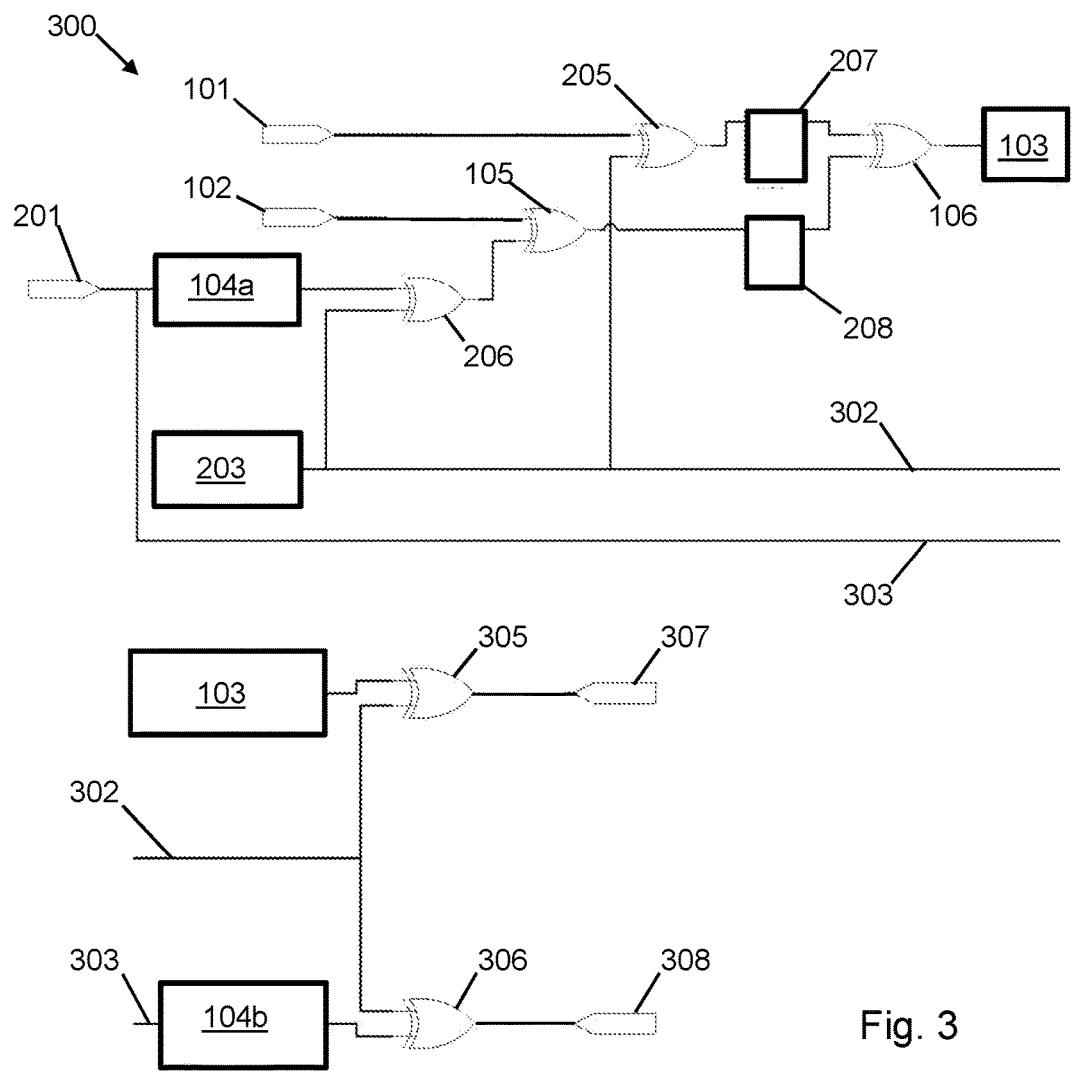
FIG. 3 is a schematic circuit diagram of an alternative example embodiment for storing and retrieving a value.

FIG. 3 illustrates a further alternative example embodiment of a circuit 300 for storing and retrieving data values. The circuit 300 has the same components as in the circuit in FIG. 2, but with the addition of fifth and sixth XOR gates 305, 306 at the output stage. The fifth XOR gate 305 has inputs connected to the output of the shift register 103 and the third random number generator 203 (via connection 302), while the sixth XOR gate 306 has inputs connected to the third random number generator 203 (also via connection 302) and the second random number generator 104b, which is fed (via connection 303) with the same random number seed at input 201. The outputs of the XOR gates 305, 306 form the outputs of the circuit 300. This arrangement serves to further mask the data values being output from the shift register 103.

Figure 4:
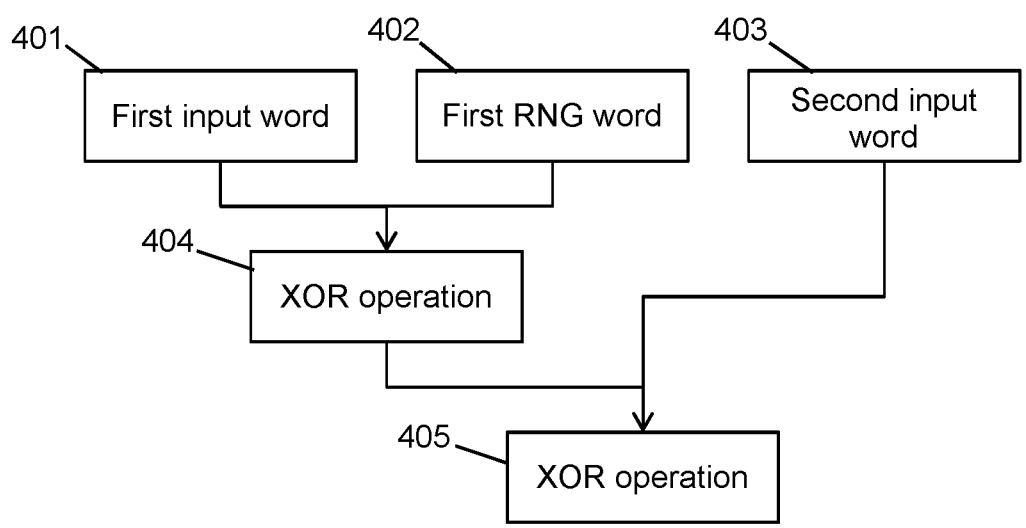
FIG. 4 is a schematic flow diagram illustrating operation of the example embodiment of FIG. 1.

FIG. 4 is a schematic flow diagram illustrating an example embodiment of a method of storing a value comprising a series of words, as for example carried out by the circuit 100 of FIG. 1. Steps 401, 402 and 403 represent words being provided at the first input 101, the first random number generator 104a and the second input 102 respectively. The words from the first input 101 and the first random number generator 104a are combined in an XOR operation at step 404, and the output from this operation is combined at step 405 in a further XOR operation with the word from the second input 102.

From reading the present disclosure, other variations and modifications will be apparent to the skilled person. Such variations and modifications may involve equivalent and other features which are already known in the art of secure data storage, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfill the functions of several means recited in the claims and reference signs in the claims shall not be construed as limiting the scope of the claims.

The invention claimed is:

1. A method of securely storing a value comprising a series of words, the method comprising:
   i) combining, with a first XOR gate, a word of a first portion of the value, and an output word of a first pseudo random number generator, and combining, with a second XOR gate, output of the first XOR gate with a word of a second portion of the value, to provide a first combined word;
   ii) storing the first combined word in a shift register;
   iii) repeating steps i) and ii) for each successive word of the first and second portions of the value;
   iv) outputting a first output word from the shift register; combining, with a third XOR gate, the first output word with an output word of a true random number generator to provide a first combined output word;
   v) outputting a second output word from a second pseudo random number generator; and combining, with a fourth XOR gate, the second output word with the output word of the true random number generator to provide a second combined output word; and
   vi) repeating steps iv) and v) for each successive word stored in the shift register.

2. The method of claim 1, wherein the first pseudo random number generator and the second pseudo random number generator are configured to generate the same sequence of words, and the outputs from the first pseudo random number generator and the second pseudo random number generator are shifted relative to each other in the sequence of words by a length of the shift register.

3. The method of claim 1, wherein step i) further comprises:
   ia) combining, with the third XOR gate, the output word of the first pseudo random number generator with an output word of the true random number generator to provide a second combined word;
   ib) combining, with the fourth XOR gate, the word of the second portion of the value with the second combined word to provide a third combined word;
   ic) combining, with a fifth XOR gate, the output word of the true random number generator with the word of the first portion of the value to provide a fourth combined word; and
   id) combining, with a sixth XOR gate, the fourth combined word with the third combined word to provide the first combined word.

4. The method of claim 1, wherein the true random number generator generates a different sequence of words to the sequence of words generated by the first and second pseudo random number generators.

5. A circuit for storing a value comprising a series of words, the circuit comprising:
   a first input configured to receive a word of a first portion of the value;
   a second input configured to receive a word of a second portion of the value;
   a first pseudo random number generator;
   a second pseudo random number generator;
   a true random number generator;
   a first XOR gate having inputs connected to the second input and an output of the first pseudo random number generator;
   a second XOR gate having inputs connected to the first input and an output of the first XOR gate;
   a shift register having an input connected to an output of the second XOR gate and having an output;
   a third XOR gate connected between the first input and the second XOR gate, the third XOR gate having inputs connected to the first input and an output of the true random number generator and an output connected to an input of the second XOR gate; and
   a fourth XOR gate connected between the first pseudo random number generator and the first XOR gate, the fourth XOR gate having inputs connected to the first pseudo random number generator and the true random number generator and an output connected to an input of the first XOR gate.

6. The circuit of claim 5, wherein the first pseudo random number generator and the pseudo second random number generator are configured to generate the same sequence of words, and the outputs from the first pseudo random number generator and the second pseudo random number generator are shifted relative to each other in the sequence of words by a length of the shift register.

7. The circuit of claim 6, wherein the true random number generator is configured to generate a different sequence of words to the sequence of words generated by the first and second pseudo random number generators.

8. The circuit of claim 5, further comprising:
   a fifth XOR gate having inputs connected to the output of the shift register and the true random number generator; and
   a sixth XOR gate having inputs connected to the second random number generator and the true random number generator.

9. A card comprising an integrated circuit (IC) having the circuit according to claim 5.

* * * * *